US012385775B2

(12) United States Patent
Dietrich et al.

(10) Patent No.: US 12,385,775 B2
(45) Date of Patent: Aug. 12, 2025

(54) WEIGHBRIDGE CONVEYOR BELT SCALE

(71) Applicants: Todd Dietrich, Lenzburg, IL (US);
Ronald Dietrich, Lenzburg, IL (US)

(72) Inventors: Todd Dietrich, Lenzburg, IL (US);
Ronald Dietrich, Lenzburg, IL (US)

( * ) Notice: Subject to any disclaimer, the term of this patent is extended or adjusted under 35 U.S.C. 154(b) by 466 days.

(21) Appl. No.: 17/803,673

(22) Filed: Oct. 7, 2022

(65) Prior Publication Data

US 2024/0035876 A1 Feb. 1, 2024

Related U.S. Application Data

(60) Provisional application No. 63/369,537, filed on Jul. 27, 2022.

(51) Int. Cl.
| | | |
|---|---|---|
| *G01G 11/00* | (2006.01) | |
| *A23G 3/44* | (2006.01) | |
| *A23L 29/10* | (2016.01) | |
| *A23L 29/212* | (2016.01) | |
| *A23L 29/262* | (2016.01) | |
| *A23L 33/15* | (2016.01) | |
| *A23P 30/40* | (2016.01) | |
| *B65G 39/12* | (2006.01) | |

(52) U.S. Cl.
CPC .............. *G01G 11/003* (2013.01); *A23G 3/44* (2013.01); *A23L 29/10* (2016.08); *A23L 29/212* (2016.08); *A23L 29/262* (2016.08); *A23L 33/15* (2016.08); *A23P 30/40* (2016.08); *B65G 39/12* (2013.01); *B65G 2201/04* (2013.01); *B65G 2203/0241* (2013.01); *B65G 2203/025* (2013.01); *B65G 2203/0258* (2013.01); *B65G 2203/042* (2013.01)

(58) Field of Classification Search
CPC .......... G01G 11/003; B65G 2203/0258; B65G 2203/042
See application file for complete search history.

(56) References Cited

U.S. PATENT DOCUMENTS

| | | | | |
|---|---|---|---|---|
| 4,260,034 A | * | 4/1981 | Randolph, Jr. ........... | G01L 5/10 177/16 |
| 4,682,664 A | * | 7/1987 | Kemp .................. | G01G 11/003 73/1.13 |
| 5,338,901 A | * | 8/1994 | Dietrich ............... | G01G 11/003 177/16 |

(Continued)

*Primary Examiner* — Natalie Huls
(74) *Attorney, Agent, or Firm* — Sandberg Phoenix & von Gontard P.C.

(57) ABSTRACT

This invention relates to improvements to a weighbridge belt scale, used in combination with a conveyor system, that incorporates a pair of base plates, attached to an existing conveyor structure, each base plate contains two weight sensors, which connect upon riser blocks, to provide for uniform clearance between the mount base plates, and the idler mount plates, of the conveyor system. Various rod end bearings allow for minor corrections to the assembly imperfection, and various shims can be used to make sure that the overall height of the standard idler and the scale weighbridge are adjusted to a height that matches with the other idler rollers of the conveyor belt system. This provides for more precise calculation of the parameters being detected by the weight sensors, so that more accurate determination of the weight, speed, and volume of the materials being conveyed, are attained.

2 Claims, 7 Drawing Sheets

(56) References Cited

U.S. PATENT DOCUMENTS

| | | | | |
|---|---|---|---|---|
| 8,063,321 B2* | 11/2011 | Wineland | ............... | G01G 11/00 |
| | | | | 177/126 |
| 9,024,212 B2* | 5/2015 | Hyer | ........................ | G01G 3/12 |
| | | | | 177/52 |
| 2018/0356276 A1* | 12/2018 | Bowie | .................... | G01G 11/12 |

* cited by examiner

WEIGHBRIDGE CONVEYOR BELT SCALE

FIELD OF THE INVENTION

The concept of this invention relates to improvements to a weighbridge belt scale for use with a conveyor system, wherein the scale is applied to the mount plates of the idler roller, and extends the width of the conveyor belt, in order to accommodate and provide for more precise calibration of the measurement of and the weight of the passing material, the speed of its movement, and volume of passing material and further incorporates various transducers within load cells that convert the load into analog electric signals that furnishes more accurate measurement of the materials being conveyed, and through the usage of various strain gauges that allow the integration of the tortional component of force as applied to the weighbridge unit during conveyor belt operations.

BACKGROUND OF THE INVENTION

This invention generally relates to weighing devices, and more particularly, to conveyor belt scales of the weighbridge type, used for weighing and acquiring other data regarding material transported along a conveyor belt. Such belts have been used for continuous weighing of granular materials transported along a conveyor belt. Examples of such materials are coal, aggregate, slag, or wood chips among others.

Usually, such conveyor belts and their scales employ rollers or idlers that are installed into the conveyor system, either in place of an existing idler assembly, or in addition to existing idlers. The conveyor belt rests upon such idlers, and the material, being conveyed, passes over the idler assembly causing a downward deflection of the system. Generally, the idler assembly is cooperatively connected to a weight sensor. The weight sensor, depending upon the construction of the particular weighing device, converts that downward deflection into a weight measurement. Hence, the weighing device would combine the weight with a predetermination of the speed of movement of the conveyor belt, to yield a rate of flow of material as well as the total weight of the passing material being processed.

The Applicants' Company has obtained various patents upon improvements to various conveyor belt weighers, as can be seen in its U.S. Pat. No. 5,338,901, in addition to the conveyor weighbridge with built-in calibration weight, as noted in its U.S. Pat. No. 7,331,210. The initial patent simply provided an early embodiment in a conveyor belt weigher, wherein the weighbridge included a pair of weight transfers bars extending from each end of the device, to support the entire weight of the weighbridge and conveyor belt, and which were connected to a strain gauge, as a means for measurement of any deflections upon the belt as a result of the material load being conveyed, for use for determining both speed and weight of the materials being processed. Through the use of such a weigher, a digital readout from the early device gave an estimation of the weight aspects of the material passing along the weighbridge at any given time.

The second patent obtained by the inventors was upon further improvements to a conveyor weighbridge with built-in calibration weight. This device utilized a load cells mounted on a platform scale, supporting the conveyor belt, and a frame on which the rollers were mounted, the weighbridge included four load cells connected perpendicularly to each end of the frame, and with strain gauges, detected the amount of deflection of the conveyor belt, and through the use of a controller converted the signals of the strain gauges and the speed detector to a desired weight and volume data regarding the materials being transferred, by means of the conveyor.

The current invention provides means for adding improvements upon this particular system, and to utilize different structure to attain more accurate data.

SUMMARY OF THE INVENTION

This invention relates to improvements to the weighbridge belt scale mechanism incorporated into and to support a conveyor belt that includes various roller idlers in its construction. With regard to one of the idlers, the concept of this invention is to improve upon the weighbridge unit that is utilized for determining the various parameters of the materials being conveyed by the conveyor belt, in order to provide for a calibration primarily of the weight and speed of conveyance of the granular material and the volume being transferred.

One of the improvements is to provide for more precise determination of the calculation through the weighbridge member to furnish more accurate information regarding the speed and volume of the materials being transferred.

Another object of this invention is to provide various idler mount plates, that bear all the weight of the material travelling across the conveyor belt, which focuses the measurements directly for analysis by the weighbridge assembly of the improvements.

A further object of the invention is to provide for more accurate installation of the weighbridge scale upon various idler base plates that are mounted in lieu of the standard idler mounts as used in the prior art.

Another object of this invention is to provide for improvements to the weight sensing assemblies of the apparatus, with the use of various spherical rod end bearings, attaching to the riser blocks of the conveyor system, which block rest on the load cell of the weight sensing assembly, such that when force components are applied by compression or tortional movement, the deflection of the load cell introduces a strain-to-strain gauge, that produces an electrical signal, proportional to the load being analyzed.

To provide a little more detail relating to the subject matter of this invention, the description provided herein describes the interaction of the various components and perhaps a broader depiction of the operations of the weighbridge of the conveyor belt scale of this invention The determination of the total mass of material moved over a conveyor belt has been a known process going back to a system patented Feb. 20, 1912 by the Merrick Scale Manufacturing Company. In the majority of load-based conveyor belt scale systems, the weight of material is not directly, determined, but rather the weight of the material is supported by a rubber conveyor belt which in itself is supported by a series of conveyor idler roller frames. Although it is possible to weight the entire conveyor structure, as a more practicable solution it was found that weighing a fixed section of the conveyor structure as the material passed would derive an approximation of the weight that was accurate enough for commercial uses. These systems can be used as a basis of payment in commercial transactions, are used in process control and bulk material inventory systems.

As a generic description of the process, in a perfect world the weight of the material is carried by the conveyor belt, the weight is transferred by gravity to the conveyor idlers, the idlers are arranged at a fixed interval along the conveyor structure. The weight applied to each idler assembly is divided by the spacing of the idler frames giving a weight over distance. By sensing the travel of the conveyor belt and the material, the weight over distance can be accumulated into a total weight of material. Because the weight of the average conveyor belt as registered over the fixed section must be deducted to give the net weight of just the material.

There are also some other inadvertent forces that must be compensated for and this is addressed in the design. The load sensors have a load axis. Weight applied out of line with this axis is not sensed. The spherical rod ends take the loads applied and align them with the load sensors. The weight of the material is not all transferred directly to the weigh sensors, it must first transfer through the conveyor belt, through the conveyor idler, through the idler mount plates, through the spherical rod ends, through the riser blocks to the load receiving portion of the weigh sensors. The alignment of the idlers by means of shims under the mounting feet affect the proportion of load as carried by each idler. By closely aligning the idler rolls in a parallel plane to the conveyor belt, this alignment also reduces the effect of belt tension to the weight transfer between the material to the weigh sensors.

The weight of the material is being measured in a dynamic condition. The material mass has the effects of both momentum and gravity. As the conveyor belt is not a rigid structure the conveyor belt is also imparting a side load to the conveyor idler rollers as the conveyor belt has some sag between the idlers. Without this sag, the conveyor belt becomes a beam and the weight of the material cannot transfer through the conveyor belt. The spin of the idler rolls is also imparting a rotational torque which adds to this sideloading. The placement of the load sensors before and after the center line of the idler allow the combination of upstream load sensors to negate the added sideloading force registered on the downstream load sensors.

The weight signal in itself is useful as a means of determining carrying capacity of a conveyor system. By looking at the weight signals from each end of the idler it is possible to determine poor loading on the conveyor belt. By not centering the loading on the conveyor belt, the material being conveyed can spill off the sides and cause excessive wear to the conveyor belt itself.

When combining the weight and belt travel signals, it is possible to derive a rate of flow value and accumulate a total weight value.

These raw signals of weight and distance traveled must be converted by means of electronics into digital representations to be processed into meaningful values. The load sensors in this design are based on strain gauge loadcells. The loadcells have an arrangement of foil gauges that when excited by a fixed electric current respond with a corresponding electric signal proportional to the load applied to the sensors. These sensors are unique to this design but are generally used in many weighing systems. The described design is an improvement of the weight signal portion of the original application only.

The other signal described is a representation of belt travel. Although a fixed belt travel value can be inferred assuming the moving belt only moves at one speed, the signal is generally derived by measuring the frequency of a rotating encoder in contact with the conveyor belt.

These and other objects may become more apparent to those skilled in the art upon a review of the Summary of the Invention as provided herein, and upon undertaking a study of the Description of its Preferred Embodiment, in view of the drawings.

DETAILED LIST OF STRUCTURES OF THE IMPROVED WEIGHBRIDGE BELT SCALE

Patent Detail List

Figure 1:
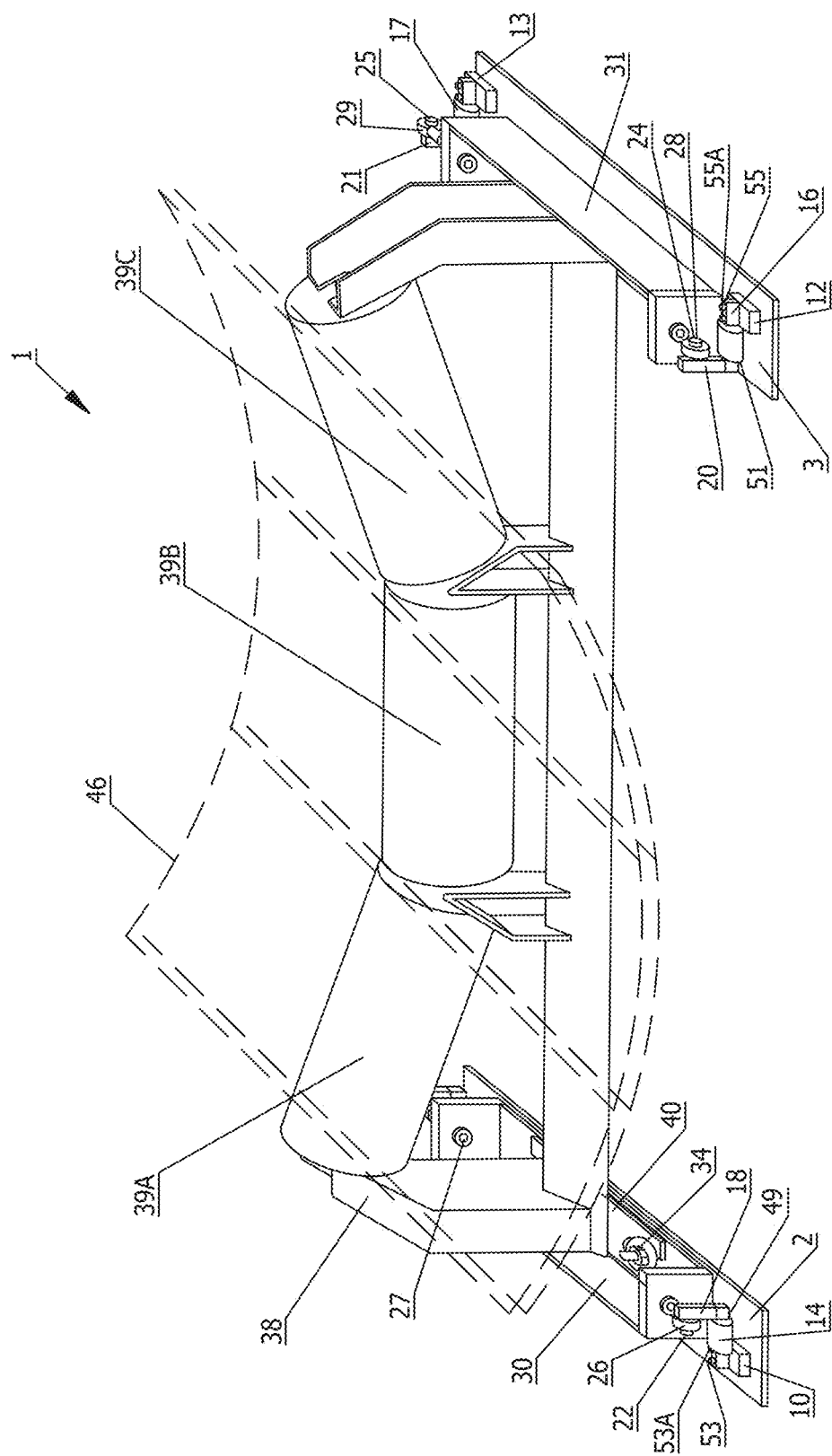
FIG. 1 illustrates the weighbridge belt scale structure of the current invention.

1. Weigh bridge assembly
2. Mount base plate (1)
3. Mount base plate (2)
4A. Mount base mounting hole (1A)
4B. Mount base mounting hole (1B)
4C. Mount base mounting hole (1C)
4D. Mount base mounting hole (1D)
4E. Mount base mounting hole (1F)
5A. Mount base mounting hole (2A)
5B. Mount base mounting hole (2B)
5C. Mount base mounting hole (2C)
5D. Mount base mounting hole (2D)
5E. Mount base mounting hole (2E)
6. Mount base bolt (1A)
7. Mount base bolt (1B)
8. Mount base bolt (2B)
9. Mount base bolt (2B)
10. Load cell mount pad (1)
11. Load cell mount pad (2)
12. Load cell mount pad (3)
13. Load cell mount pad (4)
14. Load cell (1)
15. Load cell (2)
16. Load cell (3;
17. Load cell (4)
18. Load cell riser block (1)
19. Load cell riser block (2)
20. Load cell riser block (3)
21. Load cell riser block (4)
22. Load cell riser block bolt (1)
23. Load cell riser block bolt (2)
24. Load cell riser block bolt (3)
25. Load cell riser block bolt (4)
26. Spherical rod end (1)
27. Spherical rod end (2)
28. Spherical rod end (3)
29. Spherical rod end (4)
30. Idler mount plate (1)
31. Idler mount plate (2)

37A. Idler mounting hole (1A)
32B. Idler mounting hose (1B)
32C. Idler mounting hole (1C)
32D. Idler mounting hole (1D)
32E. Idler mounting hole (1E)
33A. Idler mounting hole (2A)
33B. Idler mounting hole (2B)
33C. Idler mounting hole (2C)
33D. Idler mounting hole (2D)
33E. Idler mounting hole (2E)
34. Idler mounting bolt (1A)
35. Idler mounting bolt (1B)
36. Idler mounting bolt (2A)
37. Idler mounting bolt (2B)
38. Conveyor Idler assembly
39A. Conveyor Idler Roll A
39B. Conveyor Idler Roll B
39C. Conveyor Idler Roll C
40. Conveyor idler mounting foot 1
41. Conveyor idler mounting foot slot 1A
42. Conveyor idler mounting foot slot 1B
43. Conveyor idler mounting foot 2
44. Conveyor idler mounting foot slot 2A
45. Conveyor idler mounting foot slot 2B
46. Conveyor Belt
47. Idler shim plate (1)
47A. Idler shim plate (1A)
48. Idler shim plate (2)
48A. Idler shim plate (2A)
49. Riser Block Bottom screw (1)
50. Riser Block Bottom screw (2)
51. Riser Block Bottom screw (3)
52. Riser Block Bottom screw (4)
53. Load sensor screw (1)
53A. Load sensor screw (1A)
54. Load sensor screw (2)
54A. Load sensor screw (2A)
55. Load sensor screw (3)
55A. Load sensor screw (3A)
56. Load sensor screw (4)
56A. Load sensor screw (4A)
57. Proceeding standard idler
58. Proceeding standard idler
59. Strain gauge (1)
60. Strain gauge (2)
61. Strain gauge (3)
62. Strain gauge (4)

DESCRIPTION OF THE PREFERRED EMBODIMENT

The concept of this invention is generally to provide improvements to the mounting of the weighbridge belt scale when used in combination with one of the idler rollers of a conveyor system, so as to provide for correction and to attain more accurate data, by eliminating any assembly imperfections that previously were exhibited having adverse effects in the calculations of the parameters of materials being processed upon the conveyor system, during its usage and operations.

FIG. 1 illustrates the weighbridge belt scale of the present invention shown generally at 1. Weighbridge 1 contains a pair of mount base plates 2 and 3 that are rigidly attached to the existing conveyor structure using counter sunk bolts 6, 7, 8 and 9. The mount base plates 2 and 3 contain two weight sensors each 14,15,16 and 17 that are rigidly affixed to mount pads 10,11,12 and 13 with load cell mounting screws 53,53A,54,54A,55,55A,56 and 56A. The weight sensors 14,15,16, and 17 connect to riser blocks 18,19,20 and 21 by means of screws 49,50,51 and 52. Riser blocks 18,19,20 and 21 give uniform clearance between the mount base plates 2 and 3 with idler mount plates 30 and 31. The connection of the riser blocks 18,19,20 and 21 to the idler mounting plates 30 and 31 are through spherical rod end bearings 26,27,28 and 29 that are rigidly attached by riser bolts 22,23,24, and 25. The spherical rod end bearings 26,27,28 and 29 eliminate binding and allow for minor corrections for assembly imperfections, and to obtain more accuracy of information. All weight applied to idler mount plates 30 and 31 is transferred to weight sensors 14,15,16 and 17. Mounting plate 30 is rigidly affixed to the existing conveyor structure through a combination of mounting holes 4A,4B,4C,4D or 4E that correspond to the existing idler mounting feet 40 by means of counter sunk mounting bolts 6 and 7. The spacing of the mounting bolt holes 4A, 4B, 4C, 4D and 4E allow the weighbridge to attach to the existing conveyor structure in the same manner as a standard idler 38. The mount base plate 31 is attached with the same arrangement as idler mount 30 at the opposite end of idler 38 with the same purpose and secured by means of counter sunk mounting bolts 8 and 9 through mounting holes 5A,5B,5C,5D or 5E. The standard idler 38 is rigidly attached to idler mount plates 30 and 31 with countersunk bolts 34,35,36 and 37. The use of countersunk bolts give clearance between the opposing bolt heads 34,35,36 and 37 and 6,7,8 and 9.

Through this configuration, the idler mount plates 30 and 31 bear all of the weight of material traveling across a conveyor belt. The use of idler mount plates 30 and 31 and base mounts plates 2 and 3 makes the weigh bridge assembly 1 very versatile and adaptable to most conveyors as the idler mounting holes 32A,32B,32C,32D,32E, 33A,33B,33C,33D and 33E match the base plate mounting holes 4A,4B,4C, 4D,4E,5A,5B,5C,5D and 5E. These combinations then match the slotted feet shown as 41,42,44 and 45.

The existing idler 38 is not modified to fit weighbridge assembly 1, the idler base plate mounting holes 32A,32B, 32C,32D,32E, 33A,33B,33C,33D and 33E are spaced to match the standard idler 38 spacing between the existing mounting foot 41 and 44.

The overall height of the standard idler 57 proceeding and the standard idler 58 following the scale weighbridge are adjusted with shims 47,47A, 48 and 48A to a height to match the idler 38 on the weighbridge. This gives uniform weight transfer on the weighbridge and lessens the effects of changes in the belt tension in the conveyor belt 46.

Figure 2:
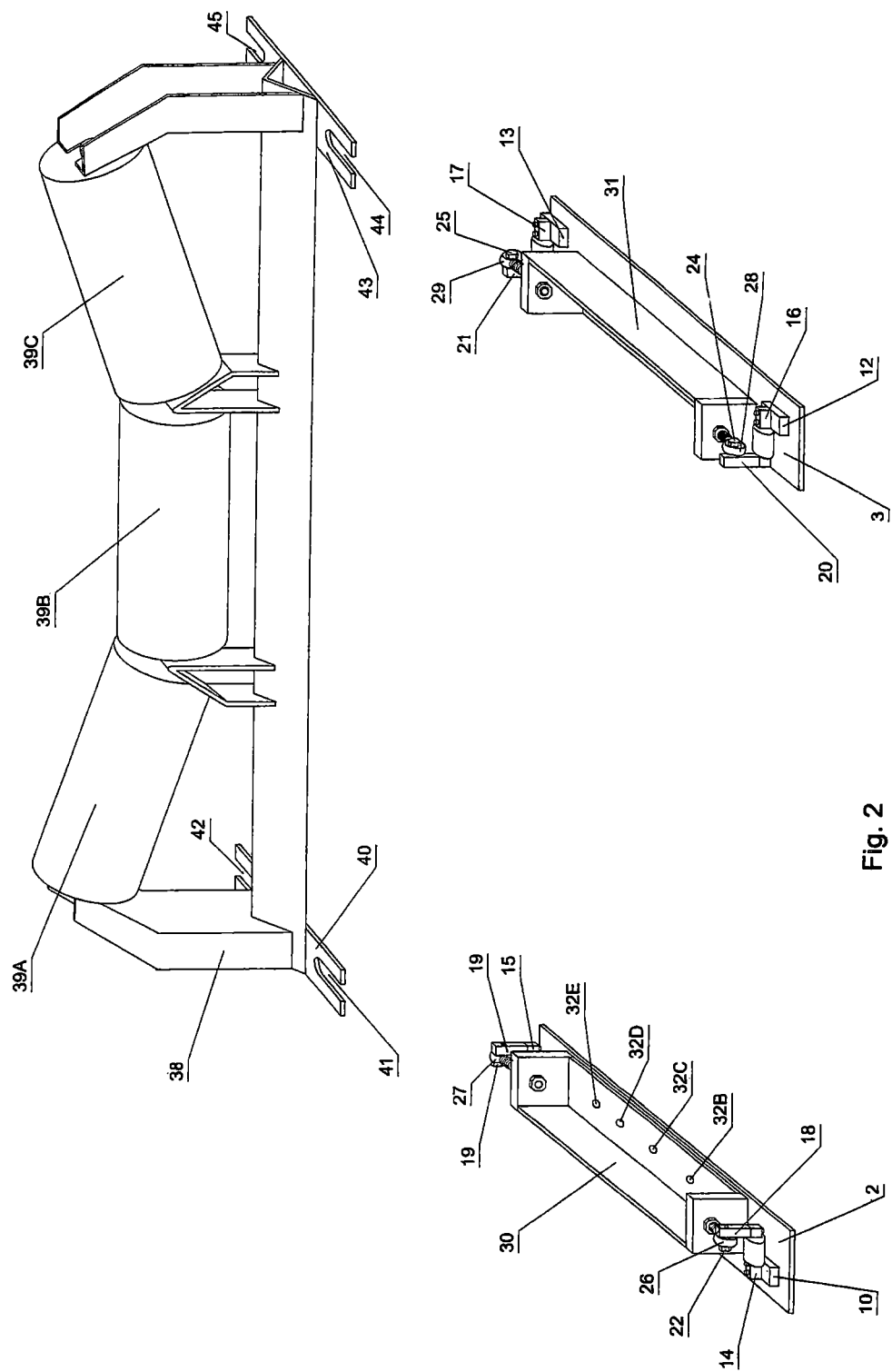
FIG. 2 is an exploded view showing the conveyor assembly, and the attachment of the idler mount plates as supported upon the weight sensors of the strain gauge of this improvement.
Figure 3:
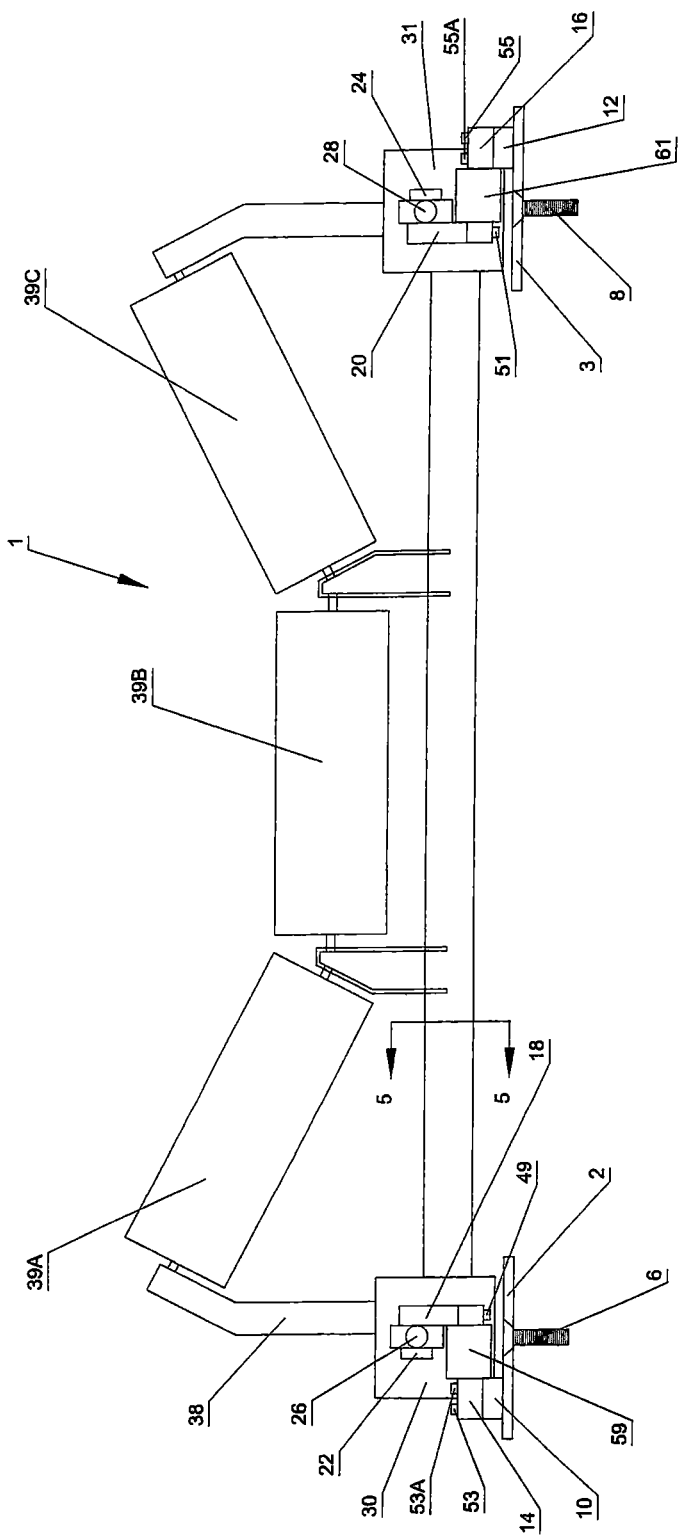
FIG. 3 shows a front view of the conveyor belt scale assembly of this invention.
Figure 4:
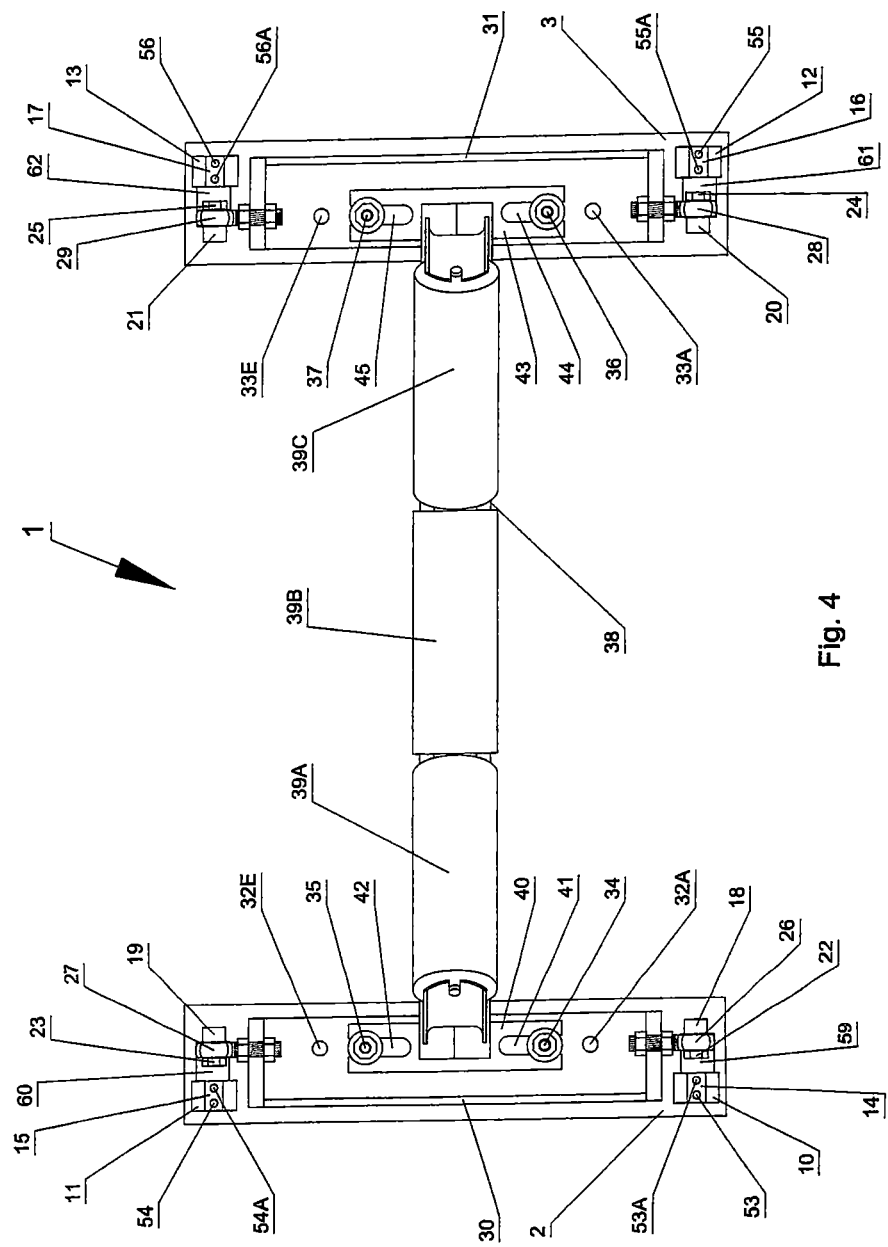
FIG. 4 provides a top view of the conveyor belt scale assembly of this invention.

FIGS. 2, 3 and 4 further illustrate the relationship of the component parts of weighbridge 1.

Figure 5:
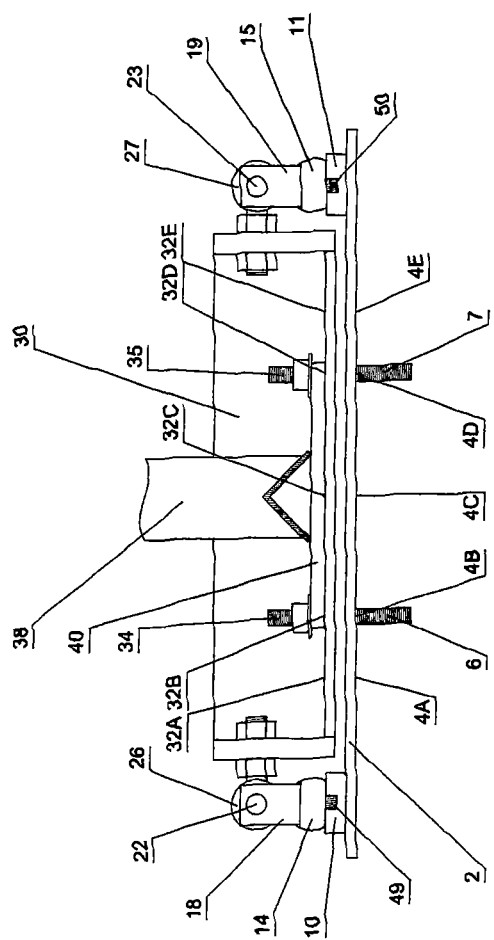
FIG. 5 provides a side view of the lateral mount for the conveyor belt weighbridge assembly as supports that supports the overall idler conveyor of this invention.
Figure 6:
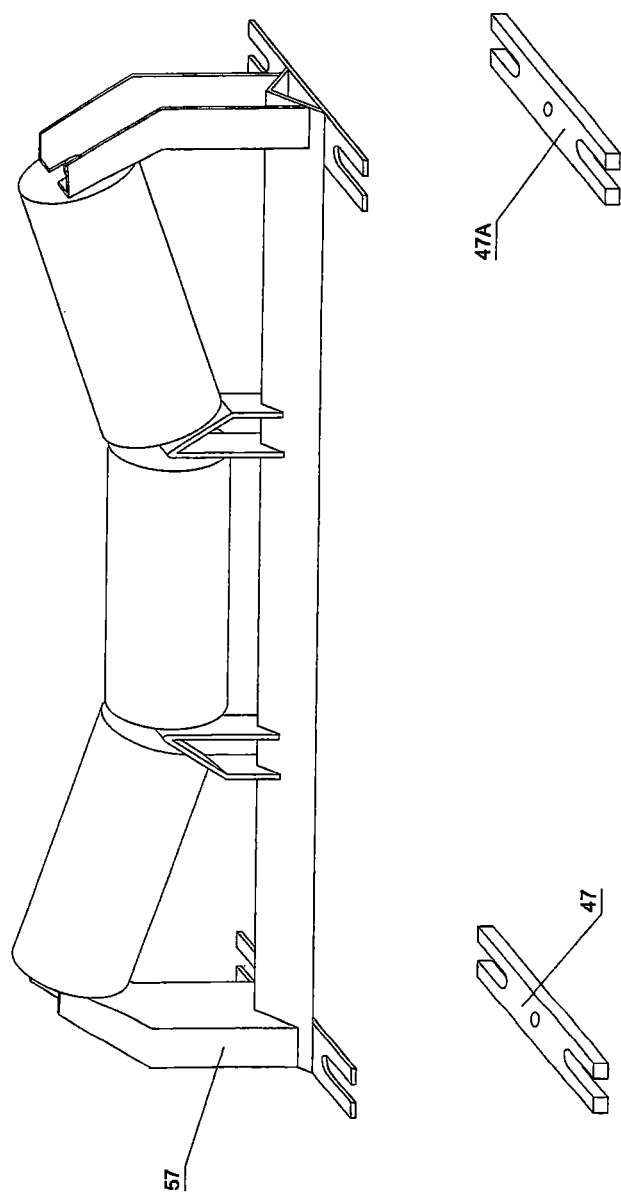
FIG. 6 shows a scaled down view of the conveyor idler roller, utilizing various shim to accommodate the adjustment of the height of the idler on the weighbridge assembly.
Figure 7:
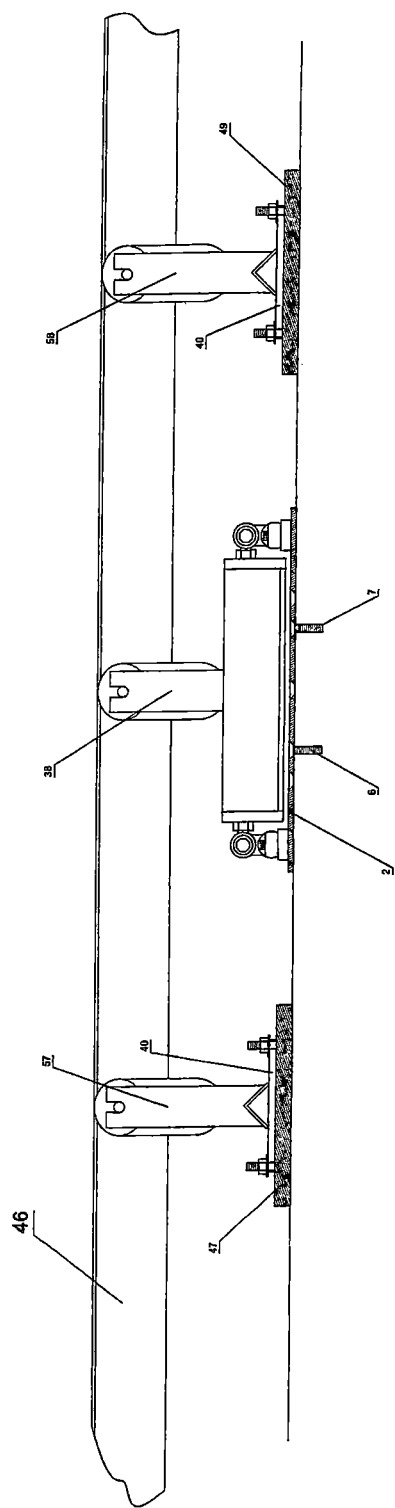
FIG. 7 shows a pair of idler rollers, located to either side of the improved idler mounted in conjunction with the weighbridge assembly of this invention.

Turning now the weight sensing assemblies of the apparatus, base plate assembly 2 and idler mount 30 are shown in greater detail at FIG. 5. FIG. 5 shows mount base plate 2 and the configuration of a standard conveyor idler 38. Idler foot 40 is securely attached to idler mount 30 by means of idler mount bolts 34 and 35. Spherical rod end bearings 26 and 27 rigidly attach to both ends of idler mount 30. The eyes of spherical rod end 26 and 27 are attached to riser blocks 18 and 19 respectively by load cell riser block bolts 22 and 23. Riser block 18 rests on load cell 14 and riser block 19 rests on load cell 15. The load cells are transducers that convert the load transmitted by the riser blocks into analog electric signals. This conversion is achieved by the physical deformation of strain gauge 59 which is mounted to the load cell and wired into a wheat stone bridge configuration. When a force component is applied to a load cell by compression or tortional movement, a deflection of the load cell introduces strain to-strain gauge 59. Strain produces an electrical resistance change proportional to the load. A corresponding weight sensor assembly 15 with strain gauge 60 located on the opposite end of the mount base plate 2 from weight sensor assembly 14, and is illustrated at FIG. 4. A corresponding mount base plate 3 with load cells 16 and 17 and strain gauges 61 and 62 are similarly mount on the opposite end of standard idler 38 with the same arrangement as mount base plate 2. This four-load cell, four strain gauge arrangement allows for integration of the tortional component of force as applied on the weighbridge unit. The data collected in the form of electrical signals is then converted by a microprocessor into empirical data representing speed, weight, and volume of material being processed.

Variations or modifications to the subject matter of this invention may occur to those skilled in the art upon review of the subject matter of this invention as described herein. Such variations, if within the spirit of this invention, are intended to be encompassed within the scope of any claims to patent protection issuing upon this development. The description of the invention as set forth in the Specification, and its depiction in the Drawings, are generally set forth for illustrative purposes only.

We claim:

1. Improvements to a weighbridge, the weighbridge being mounted to a conveyor belt structure and provided for measuring weight, volume and speed data of granular material being conveyed upon the on a conveyor belt of the conveyor belt structure, the weighbridge provided for calibration of the data while the conveyor belt structure is in operation, comprising:

an idler roller provided for supporting the conveyor belt during operation of the conveyor belt structure, the idler roller being attached to the conveyor belt structure, the weighbridge comprising a pair of idler mount baseplates, the pair of idler mount baseplates being affixed to the conveyor belt structure on opposite sides of the conveyor belt, each idler mount baseplate having opposite ends and a load cell at the opposite ends of each idler mount baseplate, each load cell is affixed to a mount pad at the opposite ends of each idler mount baseplate, a riser block connects each load cell at the opposite ends of each idler mount baseplate to a spherical rod end bearing at the opposite ends of each idler mount baseplate thereby lessen binding of the weighbridge, each riser block rests on an associated load cell, the load cells incorporating transducers that convert a load transmitted by the riser blocks into analog electric signals, wherein when physical deformation of a strain gauge occurs through compression or torsional movements generated during conveyor belt structure operation, creating pressure upon the strain guage to generate electric signals, wherein there are four load cells and four strain gauges in the weighbridge for generating signals transmitted for deriving in a microprocessor the speed, volume and weight data of the granular material being conveyed by the conveyor belt structure.

2. The weighbridge of claim 1, and including shims provided for locating beneath the weighbridge and the idler mount baseplates to provide matching of a height of an associated idler structure when assembled for operation.

\* \* \* \* \*